United States Patent
Sullivan

(10) Patent No.: US 7,032,872 B2
(45) Date of Patent: Apr. 25, 2006

(54) UNIVERSAL LAPTOP COMPUTER MOUNT

(75) Inventor: Chad D. Sullivan, Wisconsin Rapids, WI (US)

(73) Assignee: Gamber Johnson LLC, Stevens Point, WI (US)

( * ) Notice: Subject to any disclaimer, the term of this patent is extended or adjusted under 35 U.S.C. 154(b) by 0 days.

(21) Appl. No.: 10/361,632

(22) Filed: Feb. 11, 2003

(65) Prior Publication Data

US 2003/0218113 A1    Nov. 27, 2003

Related U.S. Application Data

(60) Provisional application No. 60/382,021, filed on May 22, 2002.

(51) Int. Cl.
*A47B 91/00*   (2006.01)

(52) U.S. Cl. ............................ 248/346.07; 248/346.06

(58) Field of Classification Search ........... 248/346.03, 248/346.04, 346.06, 310, 346.07, 924, 346.5, 248/316.7, 221.11, 222.51, 222.52, 225.21, 248/500, 506; 312/223.2, 246, 248, 205
See application file for complete search history.

(56) References Cited

U.S. PATENT DOCUMENTS

| | | | |
|---|---|---|---|
| 4,863,124 A * | 9/1989 | Ball et al. ...................... 108/28 |
| 4,913,390 A | 4/1990 | Berke ........................ 248/176 |
| 5,082,233 A | 1/1992 | Ayers et al. ................ 248/553 |
| 5,116,010 A | 5/1992 | McMasters et al. ...... 248/309.1 |
| 5,169,114 A | 12/1992 | O'Neill ...................... 248/551 |
| D349,107 S | 7/1994 | Rude et al. ................ D14/114 |
| 5,340,076 A * | 8/1994 | Dockwiller, III ............ 248/371 |
| 5,465,931 A | 11/1995 | MacDonald .............. 248/118.3 |
| 5,595,074 A | 1/1997 | Munro .......................... 70/58 |
| RE35,677 E | 12/1997 | O'Neill ...................... 248/551 |
| 5,722,624 A | 3/1998 | Watt et al. .................. 248/205 |
| 5,827,026 A * | 10/1998 | Patti ........................... 411/174 |
| 5,839,713 A * | 11/1998 | Wright .................. 248/346.01 |
| 5,903,645 A * | 5/1999 | Tsay ........................... 379/455 |
| 6,021,720 A * | 2/2000 | Boos et al. .................... 108/44 |
| 6,115,247 A | 9/2000 | Helot ......................... 361/686 |
| 6,382,580 B1 * | 5/2002 | Wisniewski .............. 248/316.4 |
| 6,421,242 B1 * | 7/2002 | Chen .......................... 361/704 |
| 6,488,256 B1 * | 12/2002 | Chang ........................ 248/670 |
| 6,585,212 B1 * | 7/2003 | Carnevali .............. 248/346.07 |

* cited by examiner

Primary Examiner—A. Joseph Wujciak
(74) Attorney, Agent, or Firm—Oblon, Spivak, McClelland, Maier & Neustadt, P.C.

(57) ABSTRACT

A universal laptop computer mount for mounting a laptop thereon includes a mounting surface member and at least one hold down member which is pivotably mounted, slidably mounted or both pivotably and slidably mounted on the mounting surface member for securing the laptop computer to the mounting surface member. The at least one hold down member may include at least first and second clips located on opposite sides, front and rear portions or on all sides of the mounting surface to secure the laptop in place. The mounting surface member may include first and second mounting surface members wherein the second mounting surface member is slidable with respect to the first mounting surface member. The method of assembly of the mount and of securing a laptop or other object to the mount is also disclosed.

9 Claims, 4 Drawing Sheets

UNIVERSAL LAPTOP COMPUTER MOUNT

BACKGROUND OF THE INVENTION

1. Field of the Invention

The present invention is directed to a universal laptop computer mount that incorporates unique features for allowing the mounting of different sized computers to permit both quick installation and removal of the computers from the mount.

2. Discussion of the Background Art

Laptop computer supports are known in the industry and are exemplified by those shown in U.S. Pat. No. 5,722,624, U.S. Pat. No. 5,595,074 and U.S. Pat. No. 4,913,390, the disclosure of each of which is herein incorporated by reference. While each of these supports are effective in securing a laptop computer to the mount, such are unnecessarily complex in structure and thus are characterized by having a complicated design, assembly and manufacturing process. In addition, securing of the laptop computer to the mount may not result in reliable mounting of the same in the event a lateral force or an upward force on the mount is generated such as when the mount is traveling in a vehicle or during a flight on an aircraft. Accordingly, there is a need for a reliable computer mount which can secure laptop computer to the mount in a reliable fashion and can secure the same even when the mount is subject to a jarring action in the application of forces to the mount in any direction.

SUMMARY OF THE INVENTION

An object of the present invention is to overcome the deficiencies of the above-noted prior art and to make certain that a reliable mount is provided which permits securing of a laptop thereto in a easy manner and permitting assembly of the mount to be accomplished with a minimum number of parts, at a relatively low cost and obtain secure mounting in a more reliable manner than that available by conventional mounts.

A further object of the present invention is to provide a universal laptop computer mount for mounting a laptop thereon which includes a mounting surface member and at least one hold-down member pivotably mounted on the mounting surface member for securing a laptop computer to the mounting surface member in a reliable fashion. The hold-down member may comprise at least one of a plurality of clips located on opposite sides and/or clips located on front and rear portions of the mounting surface. The at least one hold-down member may comprise a projecting member located at an end portion of the hold-down member which is engageable with an upper surface portion of the laptop member, the hold-down member being pivotably movable so that the projecting member is in turn movable towards or away from the mounting surface member so as to secure the laptop in place.

A further object of the present invention is to provide a method securing a laptop computer to the mount which comprises providing a mounting surface member upon which the laptop computer is positionable, pivotably adjustably mounting at least one hold-down member to the mounting surface member and securing the laptop computer to the mounting surface member by contacting the laptop computer with the at least one bold-down member.

It is further envisioned that while the laptop computer is securable to the mounting member, the mounting member can be universal in nature and can be used to secure other objects to a surface. Thus, it can be understood that one of ordinary skill in the art can utilize this device to secure any portable structure to a mounting surface in a reliable manner.

DESCRIPTION OF THE PREFERRED EMBODIMENTS

Figure 1:
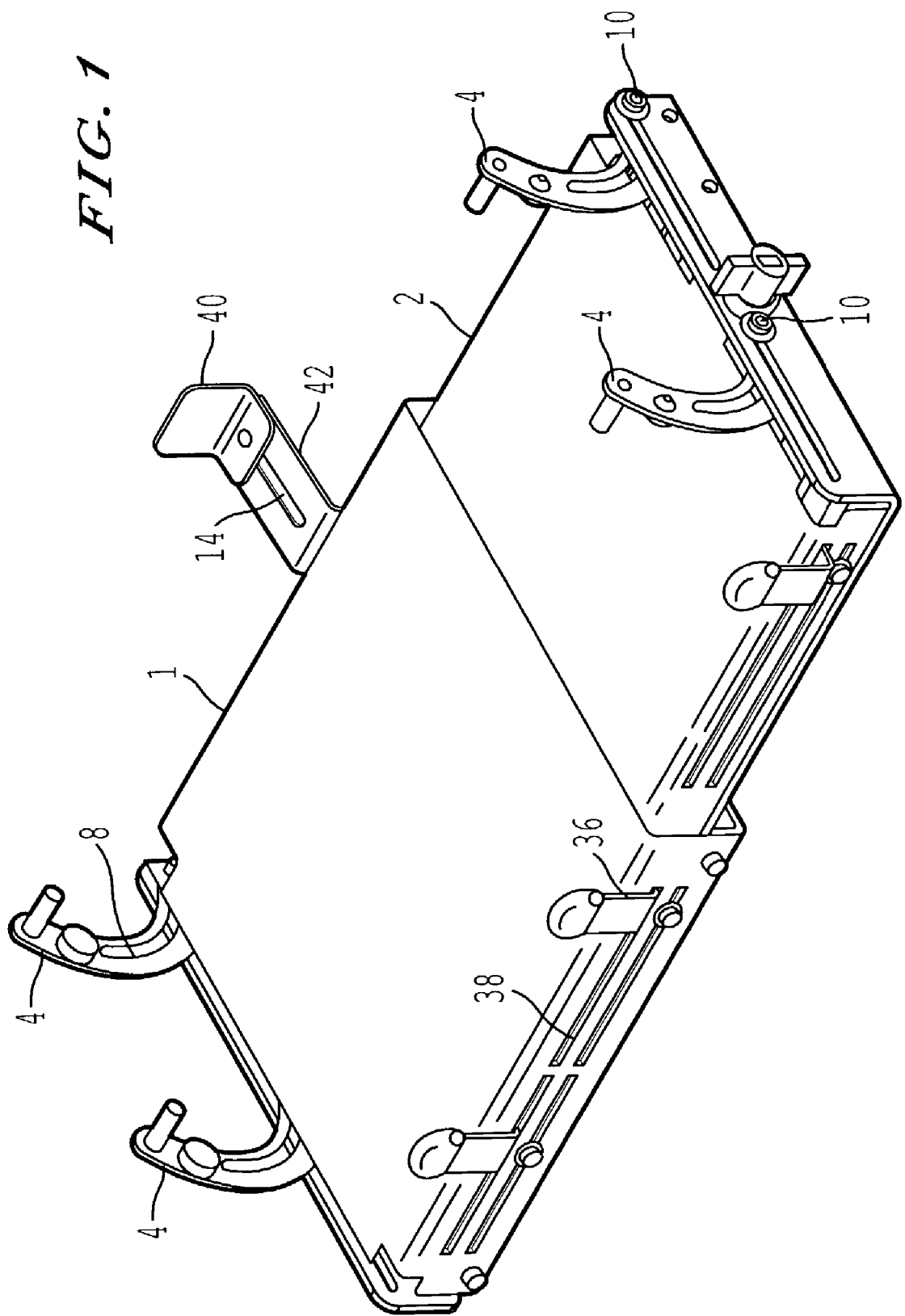
FIG. 1 is a top, front and right side perspective view of the universal laptop computer mount in accordance with the present invention.
Figure 2:
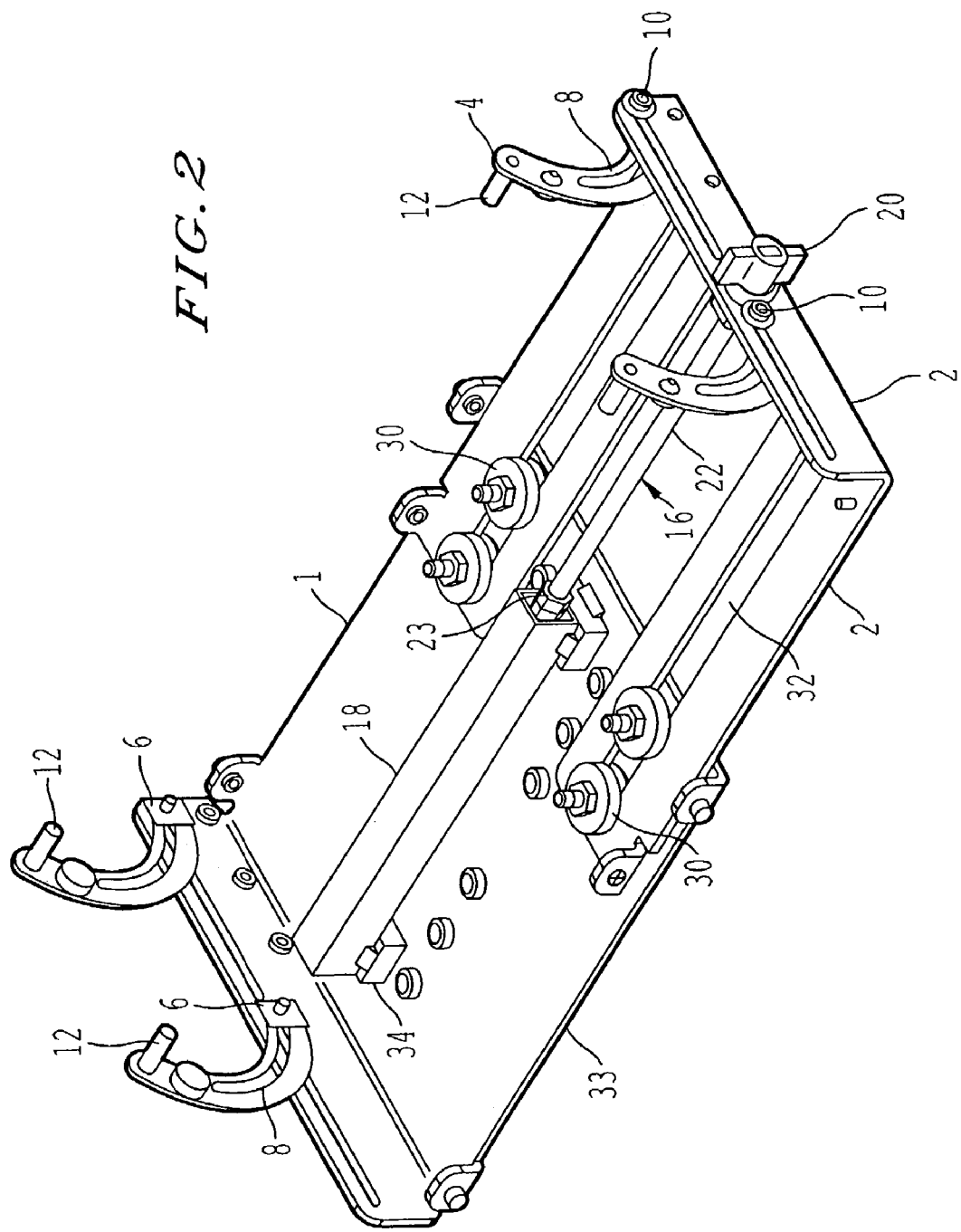
FIG. 2 is a top, front and right side perspective view thereof showing the mounting surface removed to illustrate the structure housed within the mount.

As illustrated in FIGS. 1 and 2, the computer mount device in accordance with the present invention, in a preferred embodiment thereof, comprises a two piece box having one portion thereof which is extendable in an outward manner to accommodate different sized laptop computers or other structures which are mountable on and securable to a mounting surface. The device incorporates the use of a laptop computer mounting surface 1 and a movable mounting surface extension 2 which is slidably mounted on mounting surface 1 by at least one hold-down clip 4. Each of these hold-down clips 4 are secured to the inside edges of the box utilizing U-style nuts 6 or can be mounted at other locations if desired. Each curved clip 4 has a slot 8 formed therein running substantially the length of the clip 4. The clips 4 are pressable into the U-style nuts 6 until the hole in the nut lines up with the radius of the slot 8. The clips 4 are then attached to the inside edges of the box with appropriate fasteners 10.

The U-style nuts 6 can be positioned, respectively, anywhere along the slots 8 in the curved clips 4, so as to allow the clips to be adjusted to different heights above the computer-mounting surfaces 1, 2. Since each of the clips has a curved profile, such can rotate inside the limited height of the box so as to hide the clip. This feature is important because if the clips 4 were straight, such may have to be mounted to the outside of the box and the bottom ends of the clips would hang down and cause a hazard to end users. However, it is understood that a straight clip or other orthogonal shape clip could be used if it would not hang down significantly from the box and have only limited movement in a longitudinal direction thereof or instead would only be secured in place so as to be able to pivot in a downward direction towards the computer (not shown) mounted on the mounting surfaces 1, 2 for securing the computer in place or pivot in an upward direction substantially perpendicular to the mounting surfaces 1, 2 to permit it to be removed from the mounting surfaces.

Figure 3:
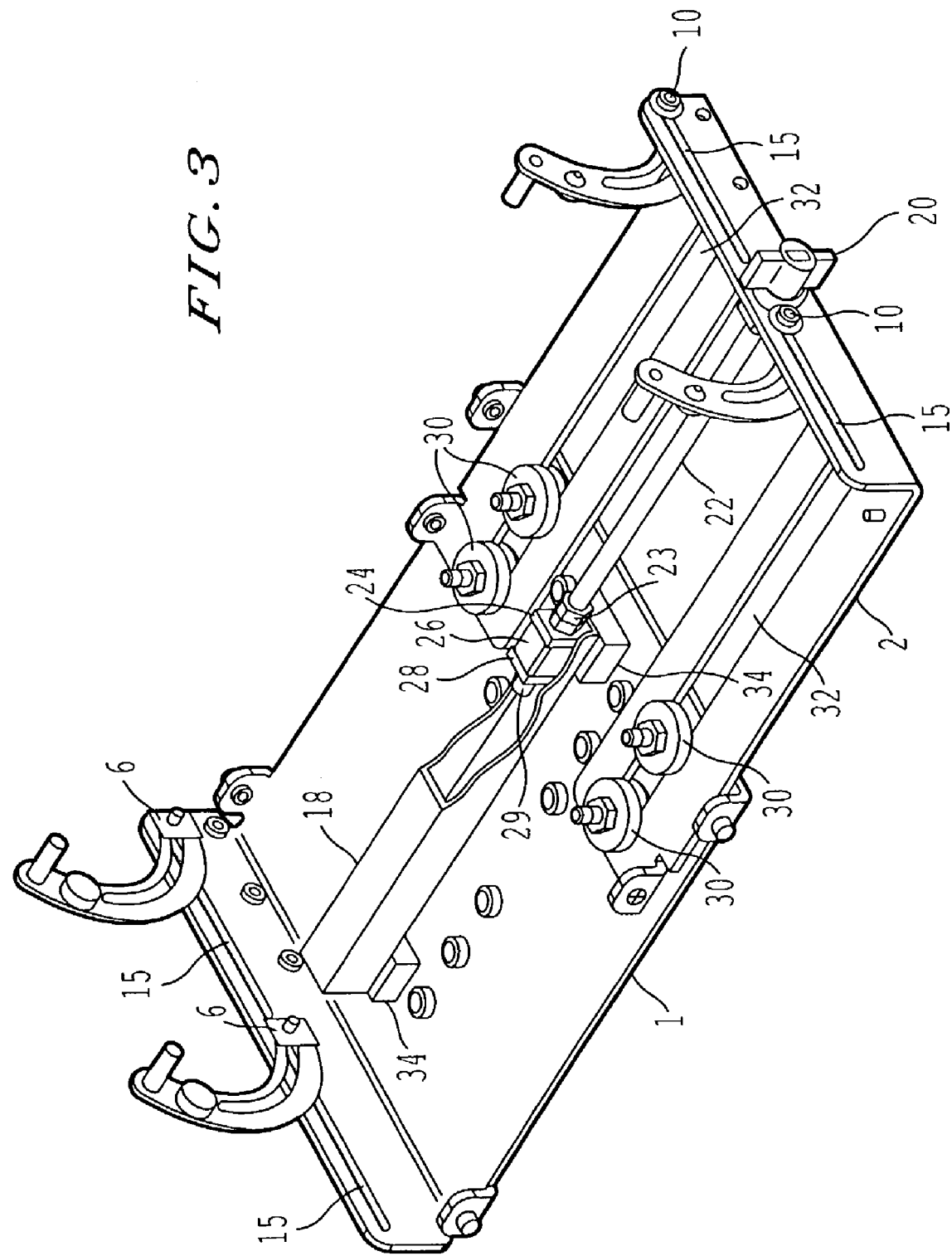
FIG. 3 shows the computer mount with the cover surface thereof removed, including a cut-away view of the lock mechanism used to lock the slidable mounting surface thereof in place.

The clips 4 have a pin type protrusion 12 at one end thereof, such protrusion being engageable with the upper surface of the laptop computer mounted on the mounting surface 1.2. While the clips 4 are shown as being mounted on the sides of the mounting surface 1 and movable extension 2, it is of course understood that the clip could also be located or even be exclusively located on the front and/or rear sides of the mounting surfaces 1, 2. The pin type protrusion 12 extends over the computer and prevents the computer from being lifted off the computer mounting surfaces 1, 2 either accidentally or intentionally. Thus clips 4 serve to reliably secure the laptop computer to the mount so as to prevent unauthorized renewal of the same or to prevent accidental removal or dislodging of the laptop from the mounting surfaces 1, 2. The protrusion 12 may be covered with a rubber sleeve of similar material to prevent any marring or scratching of the computer. Based upon tightening or loosening of the U-style nut 6, the position of each of the clips is adjustable along a slot 15 formed in flanges of mounting surfaces 1 and 2 as illustrated in FIG. 3. The nut 6 could also include a locking device as part of the structure thereof such as a key type lock or have a specially designed outer surface to permit securing of the same by a wrench of a special type of design to permit loosening of the lock of the nut.

As shown in FIGS. 2 and 3, the device incorporates the use of a mechanical friction type lock mechanism 16. The stationary bottom 33 of mounting surface 1 has a substantially square-shaped tube 18 mounted thereto although it is understood that other shaped tubes such as a circular or an elliptically shaped tube in cross section would, for example, be possible. Tube 18 comprises at least one part of the lock mechanism 16. The second part of the locking mechanism 16 is mountable to the movable extension or mounting surface 2. This lock mechanism comprises a winged turn type lock 20 wherein the lock is key actuated, for example, by insertion into a key hole formed in the lock.

A threaded rod 22 is mountable to the backside of the lock 20. A set of hex nuts 23 can be screwed onto the rod 22. These nuts 23 may comprise jam nuts and are positionable where the end portion of the lock mechanism 16 is located. In addition, a square washer 24 can be placed over the threaded rod 22. Washer 22 can be moved freely over the rod 22. A rubber plug 26 is placed over the threaded rod 22 and pushed up so as to tightly engage the washer 24. Next, a square nut 28 is screwed onto the threaded rod up to the rubber plug 26. Lastly, a cotter pin 29 is installed through a hole located at the end of the threaded rod to keep the assembly from coming off the end of the threaded rod 22.

When the mount is assembled, the threaded rod 22 with the previously assembled components is inserted into the tube 18 that is mounted to the stationary mounting surface 1. Guide members 30 are mounted on surface 1 for being positioned in slots 32 formed in the movable extension 2. This allows for a smooth linear range of adjustment of extension 2 with respect to mounting surface 1. Once the movable extension in the form of movable mounting surface 2 is positioned in the correct location to hold the computer or other object that is to be used by the end user, the wing portion of the lock 20 is turned clockwise. This clockwise rotation will turn the threaded rod 22 and pull the square nut 28 into the rubber plug 26, thus compressing the rubber plug between the square nut 28 and the square washer 24 illustrated in FIG. 3. When the rubber plug 26 is compressed, the four sides of the plug will expand and contact the inner walls of the tube 18 that is mounted on the stationary mounting surface 1. This contact causes friction and holds the movable extension mounting surface 2 at the desired location. The key 20 in the end of the wing turn locks the threaded rod 22 in place so the rod cannot be turned in either direction.

To open the mechanism, the operator need only unlock the wing lock 20 by turning and rotating the wing lock in a counterclockwise direction. The square nut 28 will back off the threaded rod 22 in turn decompressing the rubber plug 26. The plug 26 will thus return to its original shape so as to sufficiently reduce the coefficient of friction of the plug with respect to the tube 18 and the movable extension 2 will again be free to be movable either towards or away from mounting surface 1.

A spacer 34 may also be provided beneath each end of tube 18 as illustrated in FIG. 3 to align along the longitudinal axis of tube 18 with the longitudinal axis of rod 22. Retainers 36 each have an offset flange portion with a hole (not shown) such that when inserted into the top slot and rotated upward, the hole in the flange portion that was inserted in slot 38 lines up with the bottom slot shown in FIG. 1. The offset in the bracket prevents each of the retainers 36 from rotating once a securing member (unnumbered) is connected thereto as shown in FIG. 1. The computer mounting surface 1 may also have adjustable front retainers 36, 36 mounted in slots 38, 38 formed in a side portion of the computer mounting surface and be provided with an adjustable rear support bracket 40 as illustrated.

It is understood that an equivalent for the fasteners 6 may include any form of nut, bolt, screw or other type of securing mechanism to allow for adjustable securing of the clips 4 in place. It is further noted that rear support bracket 40 is adjustable with respect to the L-shaped bracket 42 having a slot 14 formed therein to which it is attached which in turn secures the same to side portion of the mounting surface 1 as illustrated in FIG. 1.

Figure 4:
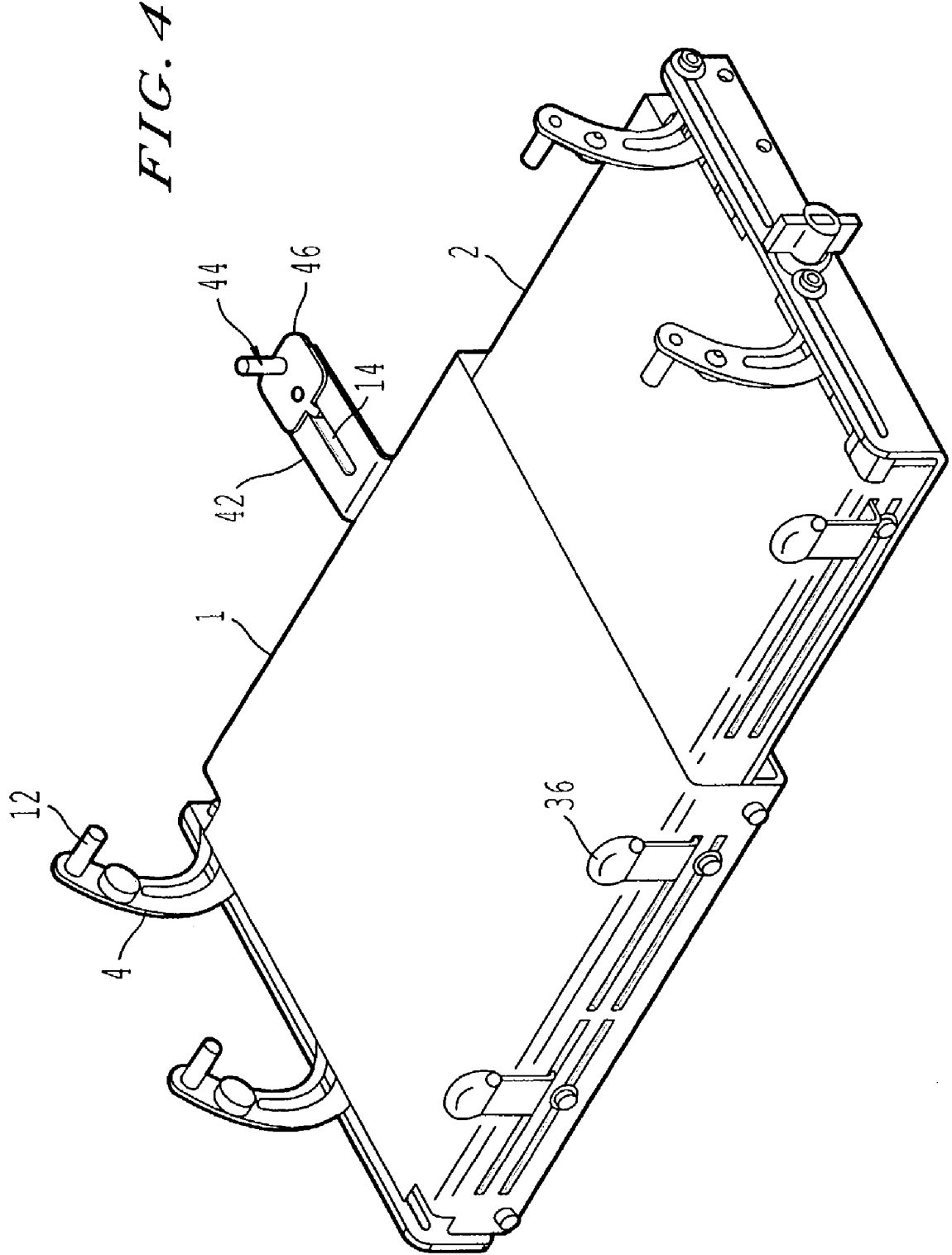
FIG. 4 shows an alternate embodiment of the mount.

In the alternative embodiment shown in FIG. 4, a bracket 44 in the form of a pin member 44 mounted on a base 46 slidably positioned on bracket 42 as shown, and is slidably attached to the base by a conventional pivot member.

The present invention also includes a method of securing laptop computer or other object to a mount by utilizing through the steps described above.

Obviously, variations on the structure shown above are possible and would be within the knowledge of one of ordinary skill in the art. These variations are considered to be within the scope of the present invention.

The invention claimed is:

1. A universal laptop computer mount for mounting a laptop thereon, which comprises:

a mounting surface member;

at least one hold-down member which comprises at least one of an arcuately slidably mounted member and a pivotably mounted member mounted on said mounting surface member so as to be movable in a direction substantially perpendicular to said mounting surface member for securing the computer to the mounting surface member, wherein said at least one hold-down member has a slot formed therein and comprises a curved clip member arcuately, slidably mounted on said mounting surface member, wherein said clip member has a slot formed therein to which a fastener is fastenable for allowing the clip to be slidably adjusted in position with respect to said mounting surface member.

2. A universal laptop computer mount for mounting a laptop thereon, which comprises:

a mounting surface member;

at least one hold-down member which comprises at least one of an arcuately slidably mounted member and a pivotably mounted member mounted on an end portion of said mounting surface member for securing the computer to the mounting surface member wherein said mounting surface member comprises a first mounting surface and a second mounting surface and wherein said second mounting surface is movably mounted on said first mounting surface; and a lock mechanism for slidably, adjustably locking in place said second mounting surface with respect to said first mounting surface, said lock mechanism including a housing and a rod slidably movable into and away from said housing and being lockable in position by said lock mechanism.

3. A universal mount for mounting an object thereon, which comprises:

a mounting surface member;

at least one hold down member which comprises at least one of an arcuately, slidably mounted member and a pivotably mounted member mounted on said mounting surface member for being moveable in a direction substantially perpendicular to the mounting member for securing the object to the mounting surface member wherein said at least one hold down member has a slot formed therein and comprises a curved clip member, and wherein said clip member has a slot formed therein which a fastener is fastenable for allowing the clip to be slidably adjusted in position with respect to said mounting surface member.

4. A method of securing a laptop computer to a mount, which comprises:

providing a mounting surface member upon which the laptop computer is positionable; and pivotably adjustably mounting at least one hold down member which comprises at least one of an arcuately slidably mounted member and a pivotably mounted member mounted on said mounting surface member in proximity with at least one end portion of said mounting member; and securing the lap top computer to the mounting surface member by contacting a portion of the computer with said at least one hold-down member.

5. The method as claimed in claim 4, wherein said mounting of said at least one hold down member comprises mounting at least a first hold-down member at least one side of said mounting surface member.

6. A method as claimed in claim 5, wherein said providing of a mounting surface member comprises providing a first and second mounting member and slidably mounting said second mounting member to said first mounting member.

7. A method as claimed in claim 4, which comprises slidably mounting said at least one hold-down member to said mounting surface.

8. A method as claimed in claim 4, wherein said at least one hold-down member is slidably movable and pivotably movable with respect to said mounting surface member.

9. A method as claimed in claim 4, which comprises mounting a U-shaped nut on the mounting surface to secure the mounted member to the mounting surface.

* * * * *